(12) United States Patent
Lee et al.

(10) Patent No.: US 11,784,007 B2
(45) Date of Patent: *Oct. 10, 2023

(54) CAPACITOR COMPONENT INCLUDING REINFORCING PATTERN IN A MARGIN/COVER PORTION

(71) Applicant: SAMSUNG ELECTRO-MECHANICS CO., LTD., Suwon-si (KR)

(72) Inventors: Jong Ho Lee, Suwon-si (KR); Yong Park, Suwon-si (KR); Woo Chul Shin, Suwon-si (KR); Ki Pyo Hong, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/966,118

(22) Filed: Oct. 14, 2022

(65) Prior Publication Data

US 2023/0030737 A1 Feb. 2, 2023

Related U.S. Application Data

(63) Continuation of application No. 16/836,333, filed on Mar. 31, 2020, now Pat. No. 11,657,976.

(30) Foreign Application Priority Data

Jul. 5, 2019 (KR) .......................... 10-2019-0081332

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/12* (2013.01); *H01G 4/248* (2013.01)

(58) Field of Classification Search
CPC ............ H01G 4/30; H01G 4/005; H01G 4/14; H01G 4/224; H01G 4/248; H01G 4/252; H01G 4/012
See application file for complete search history.

(56) References Cited

U.S. PATENT DOCUMENTS

| 7,394,646 B2 | 7/2008 | Tonogai et al. |
| 10,629,379 B2 | 4/2020 | Cho et al. |

(Continued)

FOREIGN PATENT DOCUMENTS

| CN | 205142497 U | 4/2016 |
| CN | 1841596 A | 6/2018 |

(Continued)

OTHER PUBLICATIONS

Japanese Office Action dated Jul. 20, 2021 issued in Japanese Patent Application No. 2020-070607 (with English translation).

(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A capacitor component includes a body having a lamination portion in which first internal electrodes and second internal electrodes are alternately disposed to face each other in a first direction with dielectric layers disposed therebetween, and first and second margin portions disposed on respective opposing sides of the lamination portion in a second direction perpendicular to the first direction. First and second external electrodes are disposed on respective opposing (Continued)

sides of the body in a third direction and are electrically connected to the first and second internal electrodes, respectively. Each of the first and second margin portions includes a reinforcing pattern.

37 Claims, 10 Drawing Sheets

(51) Int. Cl.
*H01G 4/12* (2006.01)
*H01G 4/248* (2006.01)

(56) References Cited

U.S. PATENT DOCUMENTS

| | | | |
|---|---|---|---|
| 10,643,792 B2 | 5/2020 | Cha | |
| 2006/0215350 A1 | 9/2006 | Tonogai et al. | |
| 2007/0195484 A1 | 8/2007 | Bultitude et al. | |
| 2007/0205514 A1 | 9/2007 | Togashi | |
| 2012/0019100 A1 | 1/2012 | Iwanaga et al. | |
| 2012/0019978 A1 | 1/2012 | Yoshida | |
| 2012/0075766 A1 | 3/2012 | Nishioka et al. | |
| 2013/0033154 A1 | 2/2013 | Sakuratani et al. | |
| 2013/0321981 A1 | 12/2013 | Ahn et al. | |
| 2014/0029157 A1 | 1/2014 | Kwag et al. | |
| 2014/0233150 A1 | 8/2014 | Chung et al. | |
| 2014/0240895 A1 | 8/2014 | Lee et al. | |
| 2014/0290993 A1 | 10/2014 | Kim et al. | |
| 2015/0016014 A1 | 1/2015 | Park et al. | |
| 2015/0043125 A1 | 2/2015 | Park et al. | |
| 2015/0114701 A1 | 4/2015 | Chung et al. | |
| 2015/0318110 A1 | 11/2015 | Lee et al. | |
| 2016/0111210 A1 | 4/2016 | Chung et al. | |
| 2017/0018363 A1 | 1/2017 | Tanaka et al. | |
| 2017/0062130 A1 | 3/2017 | Oh et al. | |
| 2017/0213647 A1 | 7/2017 | Ahn | |
| 2017/0278634 A1 | 9/2017 | Kato | |
| 2017/0345569 A1 | 11/2017 | Sakatsume et al. | |
| 2018/0190433 A1 | 1/2018 | Cho et al. | |
| 2018/0182555 A1 | 6/2018 | Kowase | |
| 2019/0172643 A1 | 6/2019 | Cha | |
| 2019/0355518 A1 | 11/2019 | Harada | |
| 2020/0066446 A1 | 2/2020 | Fukunaga et al. | |
| 2020/0066450 A1 | 2/2020 | Uenishi et al. | |
| 2020/0126721 A1 | 4/2020 | Fukunaga et al. | |

FOREIGN PATENT DOCUMENTS

| | | |
|---|---|---|
| CN | 108214710 A | 6/2018 |
| CN | 108269688 A | 7/2018 |
| CN | 109872874 A | 6/2019 |
| JP | 2004-179528 A | 6/2004 |
| JP | 2006-278556 A | 10/2006 |
| JP | 2014-204115 A | 10/2014 |
| JP | 2015-037187 A | 2/2015 |
| JP | 2017-028013 A | 2/2017 |
| JP | 2018-107239 A | 7/2018 |
| JP | 2018-110212 A | 7/2018 |
| JP | 2018-139253 A | 9/2018 |
| JP | 2019-106443 A | 6/2019 |
| JP | 2020-35788 A | 3/2020 |
| KR | 10-2005-0064802 A | 6/2005 |
| KR | 10-2005-0093879 A | 9/2005 |
| KR | 10-2017-0087665 A | 7/2017 |

OTHER PUBLICATIONS

Japanese Office Action dated Feb. 1, 2022, issued in corresponding Japanese Patent Application No. 2020-070607 (with English translation).
Chinese Office Action dated Apr. 28, 2022, issued in corresponding Chinese Patent Application No. 202010641165.2 (with English translation).
U.S. Office Action dated Nov. 14, 2022, issued in corresponding U.S. Appl. No. 16/836,333.
Chinese Office Action dated Dec. 1, 2022, issued in corresponding Chinese Patent Application No. 202010641165.2.
Chinese Office Action dated Jul. 1, 2023, issued in corresponding Chinese Patent Application No. 202010641165.2 with English translation.

I-I'

CAPACITOR COMPONENT INCLUDING REINFORCING PATTERN IN A MARGIN/COVER PORTION

CROSS-REFERENCE TO RELATED APPLICATION(S)

This application is the continuation application of U.S. patent application Ser. No. 16/836,333 filed on Mar. 31, 2020, which claims benefit of priority to Korean Patent Application No. 10-2019-0081332 filed on Jul. 5, 2019 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor (MLCC), among various types of capacitor components, has advantages of a small size, high capacity, and ease of mounting.

Recently, ceramic electronic components, particularly multilayer capacitors, have come to provide very high capacity. In order to secure such capacity, thicknesses of an effective margin, a cover, and an electrode terminal are generally reduced. A structural change as the above, however, reduces moisture resistance reliability.

Meanwhile, a multilayer ceramic capacitor has reduced capacity when it is thin. In this regard, the capacity is retained by increasing a width and a length of the capacitor. In this case, the capacitor has a reduced thickness with respect to a length thereof. When external stress such as a thermal load is applied, a crack is thus more likely to occur in the body.

Particularly in the case of a vertically mounted capacitor, tensile stress is concentrated on a ceramic portion disposed at a distal end of an external electrode, thereby more commonly generating a crack in the cover or the margin portion of the capacitor.

Accordingly, for commercial application of a thin multilayer ceramic capacitor, a need exists to provide a structure of the multilayer ceramic capacitor capable of relieving stress applied to the thin multilayer ceramic capacitor and preventing the occurrence of a crack to improve structural reliability.

SUMMARY

An aspect of the present disclosure is to provide a capacitor component capable of preventing the occurrence of a crack.

Another aspect is to provide a capacitor component capable of improving moisture resistance reliability by improving mechanical strength.

According to an aspect of the present disclosure, a capacitor component includes a body having a lamination portion in which first internal electrodes and second internal electrodes are alternately disposed to face each other in a first direction with dielectric layers disposed therebetween, and first and second margin portions disposed on respective opposing sides of the lamination portion in a second direction perpendicular to the first direction. First and second external electrodes are disposed on respective opposing sides of the body in a third direction and electrically connected to the first and second internal electrodes, respectively. Each of the first and second margin portions includes a reinforcing pattern.

According to another aspect of the present disclosure, a capacitor component includes a lamination portion in which first internal electrodes and second internal electrodes are alternately disposed to face each other in a first direction with respective dielectric layers interposed therebetween, and first and second external electrodes electrically connected to the first and second internal electrodes, respectively. The lamination portion includes a capacitance forming portion in which capacitance is formed by the first and second internal electrodes alternately disposed to face each other with respective dielectric layers interposed therebetween, and first and second cover portions respectively disposed above an uppermost internal electrode and below a lowermost internal electrode of the capacitance forming portion. The first and second cover portions include a reinforcing pattern.

According to a further aspect of the present disclosure, a capacitor component includes a lamination portion in which first internal electrodes and second internal electrodes are alternately disposed to face each other in a first direction with respective dielectric layers interposed therebetween, and first and second margin portions disposed on respective opposing sides of the lamination portion opposite each other in a second direction perpendicular to the first direction. At least one of the first and second margin portions includes a plurality of reinforcing patterns disposed in a plane parallel to the first direction to be spaced apart from each other and electrically isolated from the first and second internal electrodes.

According to another aspect of the present disclosure, a capacitor component includes a lamination portion in which first internal electrodes and second internal electrodes are alternately disposed to face each other in a first direction with respective dielectric layers interposed therebetween, and first and second external electrodes electrically connected to the first and second internal electrodes, respectively. The lamination portion includes first and second cover portions respectively disposed above an uppermost internal electrode and below a lowermost internal electrode of the first and second internal electrodes, and at least one of the first and second cover portions includes a plurality of reinforcing patterns disposed in a plane orthogonal to the first direction to be spaced apart from each other and electrically isolated from the first and second external electrodes.

According to a further aspect of the present disclosure, a capacitor component includes a lamination portion in which first internal electrodes and second internal electrodes are alternately disposed to face each other in a first direction with respective dielectric layers interposed therebetween, first and second connection portions disposed on respective opposing surfaces of the lamination portion opposite each other in a third direction, and first and second external electrodes respectively disposed on the first and second connection portions. Each of the first and second connection portions includes a metal layer contacting a respective one of the opposing surfaces of the lamination portion opposite each other in a third direction, and a ceramic layer covering the metal layer and disposed between the metal layer and a respective one of the first and second external electrodes.

BRIEF DESCRIPTION OF DRAWINGS

The above and other aspects, features, and advantages of the present disclosure will be more clearly understood from the following detailed description, taken in conjunction with the accompanying drawings, in which:

FIG. 4A is a cross-section illustrating a first internal electrode and FIG. 4B is a cross-section illustrating a second internal electrode;

DETAILED DESCRIPTION

Figure 1:
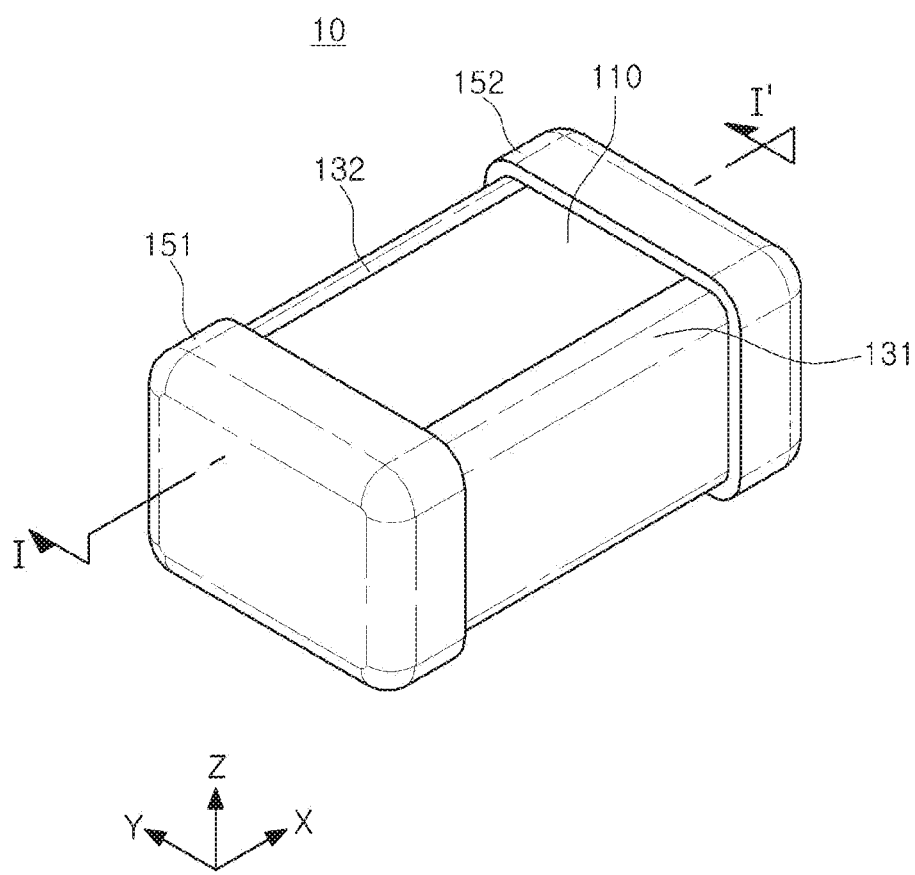
FIG. 1 is a schematic perspective view of a capacitor component according to an exemplary embodiment of the present disclosure.
Figure 2:
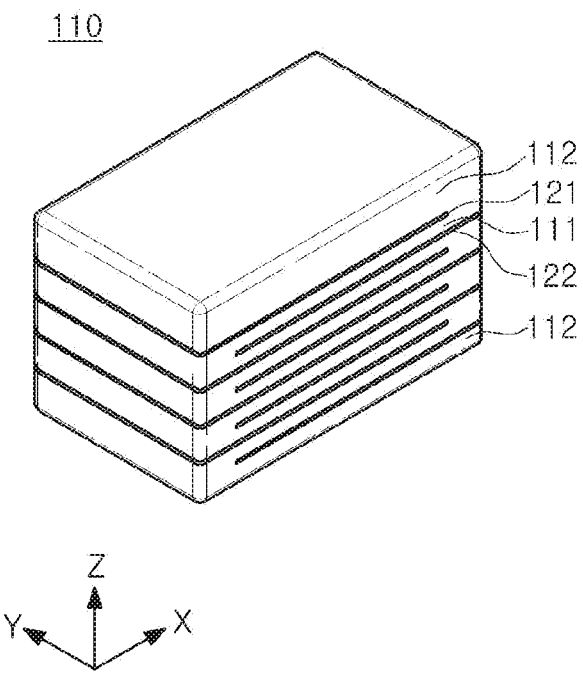
FIG. 2 is a schematic perspective view of a lamination portion of FIG. 1.
Figure 3:
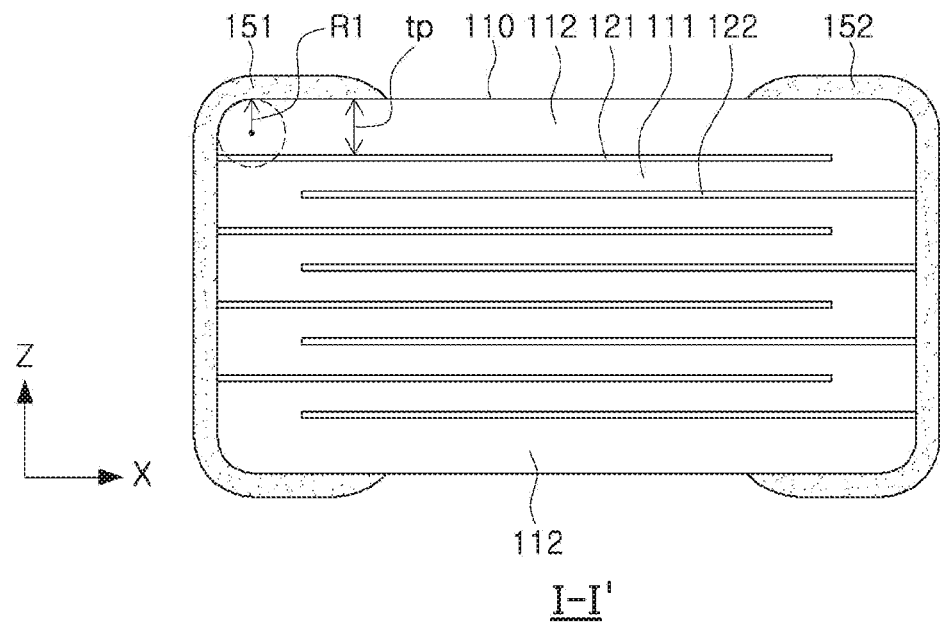
FIG. 3 is a cross-sectional view taken along line I-I' in FIG. 1.
Figure 4A:
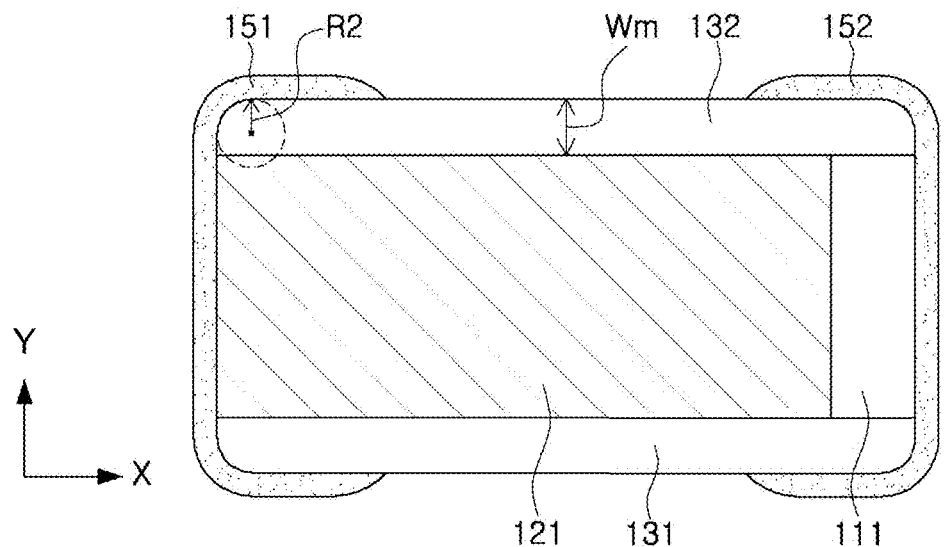
FIGS. 4A and 4B are cross-sectional views of the capacitor component of FIG. 1 taken in X-Y planes, where
Figure 4B:
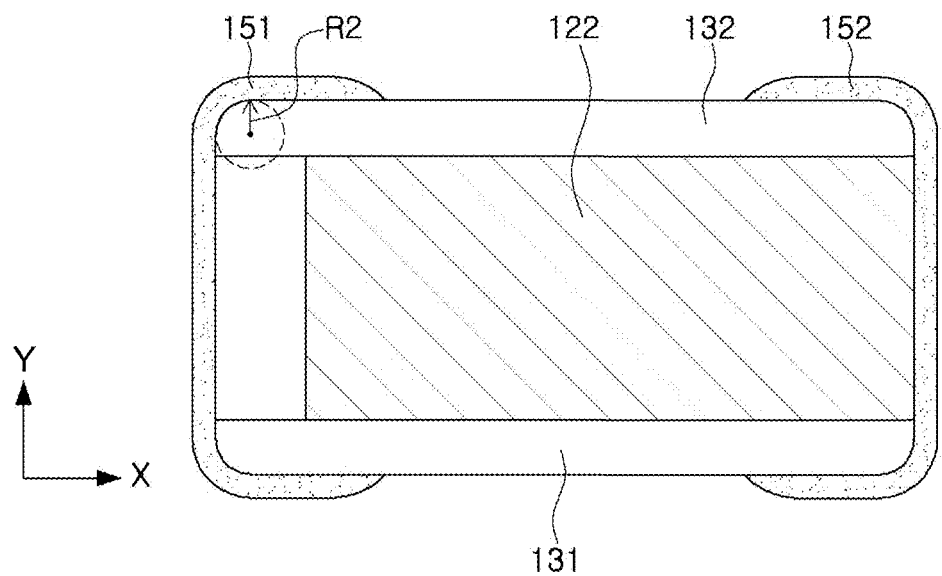
Figure 5A:
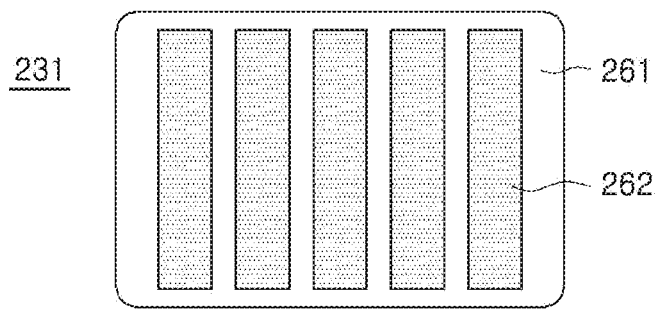
FIGS. 5A, 5B, 5C and 5D are examples of reinforcing patterns according to exemplary embodiments.
Figure 5B:
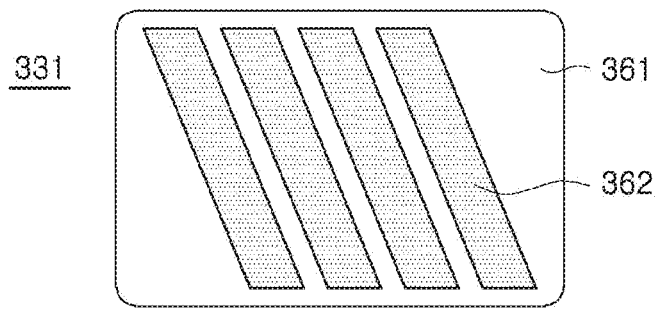
Figure 5C:
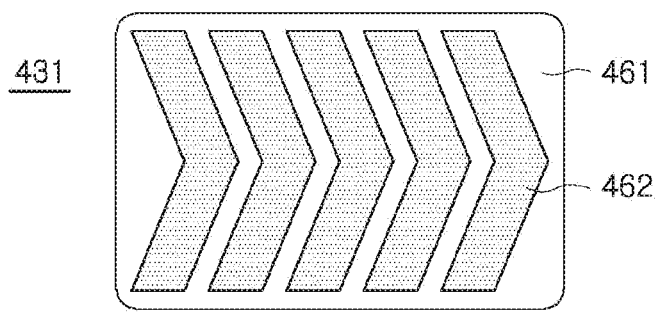
Figure 5D:
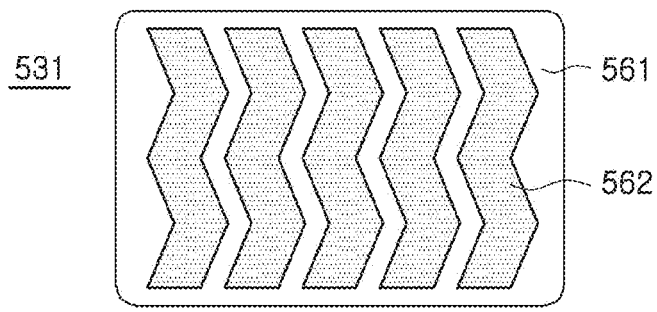

Hereinafter, embodiments of the present disclosure will be described as follows with reference to the attached drawings. The invention may be embodied in many different forms and should not be construed as being limited to the embodiments set forth herein. Rather, these embodiments are provided so that this disclosure will be thorough and complete, and will fully convey the scope of the invention to those skilled in the art. Accordingly, the shapes and dimensions of elements in the drawings may be exaggerated for clarity, and the same reference numerals will be used throughout to designate the same or like elements.

In the drawings, elements unnecessary for describing the present disclosure may be omitted for clarity, and thicknesses may be enlarged for the purpose of clearly illustrating layers and areas. The same reference numerals will be used throughout to designate the same or like elements. In the specification, unless otherwise specifically indicated, when a certain part "includes" a certain component, it is understood that other components may be further included and are not excluded.

In the drawings, an X direction may refer to a second direction, an L direction, or a length direction; a Y direction may refer to a third direction, a W direction, or a width direction; and a Z direction may refer to a first direction, a T direction, or a thickness direction.

Hereinbelow, a capacitor component according to an exemplary embodiment of the present disclosure will be described in detail in reference to FIGS. 1 to 3, 4A-4B, 5A-5D, 6A-6B, and 7A-7B.

A capacitor component 10 of the present disclosure includes a lamination portion 110 in which first and second internal electrodes 121 and 122 are alternately disposed to face each other in a first direction (Z direction) with dielectric layers 111 therebetween. A body includes the lamination portion and first and second margin portions 131 and 132 disposed on respective opposing sides of the lamination portion 110 in a second direction (X direction) perpendicular to the first direction (Z direction). First and second external electrodes 151 and 152 are disposed on respective opposing sides of the body in a third direction and electrically connected to the first and second electrodes 121 and 122, respectively. The first and second margin portions 131 and 132 each include a reinforcing pattern.

In an exemplary embodiment, the body may include the lamination portion 110, and the first and second margin portions 131 and 132.

Although not particularly limited, a specific configuration of the body may be hexahedral or a similar shape, as illustrated in the drawings. Due to oxidation of ceramic powder included in the body during plasticization, the body may not be hexahedral having perfectly straight lines but may have a substantially hexahedral configuration. The body may include a first surface and a second surface 1 and 2 opposing each other in a thickness direction (Z direction), a third surface and a fourth surface 3 and 4 connected to the first and second surfaces and opposing each other in a length direction (X direction), and a fifth surface and a sixth surface 5 and 6 connected to the first and second surfaces 1 and 2 and to the third and fourth surfaces 3 and 4 and opposing each other in a width direction (Y direction).

In an example, the dielectric layers 111 and the internal electrodes 121 and 122 may be alternately laminated in the lamination portion 110 in the first direction. A plurality of the dielectric layers 111 forming the lamination portion 110 are plasticized, and may be integrated in a single body such that boundaries between neighboring dielectric layers 111 may not be readily apparent without using a Scanning Electric Microscope (SEM).

According to an exemplary embodiment, a material forming the dielectric layers 111 is not particularly limited, as long as sufficient capacitance may be obtained therewith. For example, the material may be a barium titanate-base, a lead complex perovskite-base, or a strontium titanate-base material, or the like.

Further, as for the material forming the dielectric layers 111, various ceramic additives, organic solvents, plasticizers, binders, dispersants, or the like, may be added to barium titanate ($BaTiO_3$) powder, or the like, according to purposes of the present disclosure.

The lamination portion 110 may be formed by alternately laminating in the thickness direction (Z direction) a ceramic green sheet on which the first internal electrode 121 is printed and a ceramic green sheet on which the second internal electrode 122 is printed.

In an example of the present disclosure, a plurality of the internal electrodes 121 and 122 may be alternately disposed to face each other with respective dielectric layers 111 interposed therebetween. The internal electrodes 121 and 122 may include the first and second internal electrodes 121 and 122 alternately disposed to face each other with respective dielectric layers 111 interposed therebetween.

The first internal electrodes 121 may each be exposed to one surface of the lamination portion 110 in the second direction (X direction), and the portion exposed to the one surface in the second direction (X direction) may be connected to the first external electrode 151. The second internal electrodes 122 may each be exposed to the other opposing surface of the lamination portion 110 in the second direction (X direction), and the portion exposed to the other surface in the second direction (X direction) may be connected to the second external electrode 152. The first and second internal electrodes 121 and 122 may be electrically separated from each other by the dielectric layers 111 interposed therebetween.

A material forming the first and second internal electrodes 121 and 122 is not particularly limited, and may be, for example, a conductive paste containing at least one of silver (Ag), palladium (Pd), gold (Au), platinum (Pt), nickel (Ni), copper (Cu), tin (Sn), tungsten (W), titanium (Ti) and alloys thereof. A method for printing the conductive paste may be a screen-printing method, a gravure printing method, or the like, but is not limited thereto.

An average thickness of the first and second internal electrodes 121 and 122 may be 0.4 μm or less. The average thickness of the internal electrodes may be an average of values measured at 5 different positions in the plasticized internal electrodes. A lowest limit of the average thickness of the first and second internal electrodes is not particularly limited, but may be at least 0.01 μm.

According to another exemplary embodiment, an edge of the body 100 may have a rounded shape in the first and second directional cross section. Due to having such rounded shape, external electrodes 151 and 152 may be formed to be thin and have a uniform thickness.

The capacitor component can protect the internal electrodes by disposing the first and second margin portions 131 and 132 on both sides of the lamination portion 110 in the third direction. Further, as the first and second margin portions are separately formed, there is no need to consider manufacturing errors such as misalignment of the internal electrodes, or the like.

In an exemplary embodiment, the first and second margin portions 131 and 132 may be disposed on respective opposing surfaces (fifth surface and six surface) of the lamination portion 110 in a third direction (Y direction) perpendicular to the first and second directions. Further, the first and second margin portions 131 and 132 may include a reinforcing pattern. The reinforcing pattern included inside the margin portions may refer to at least one end of ends of the reinforcing pattern disposed inside the margin portion, and at least one end of the ends of the reinforcing pattern that is not exposed externally. When all ends of the reinforcing pattern are disposed inside the margin portions, the reinforcing pattern may have a structure of not being exposed externally of the margin portions.

Hereinbelow, structures of the first margin portion 131 and/or the second margin portion 132 will be described with reference to the drawings. Reference numerals relative to the first margin portion 131 and/or the second margin portion 132 may be interchangeably used.

The reinforcing pattern may include a layer distinguished from the margin portions, and may be disposed inside the margin portion while having its own thickness. A crack of the capacitor component can be prevented by including such reinforcing pattern in the margin portion.

Such reinforcing pattern may have various shapes. FIGS. 5A-5D are diagrams schematically illustrating various reinforcing patterns that may be disposed inside the margin portions 231, 331, 431 and 531, respectively. Referring to FIGS. 5A-5D, the reinforcing pattern may have a rectangular shape 262 on dielectric layer 261, a parallelogrammic shape 362 on dielectric layer 361, a clamp shape 462 on dielectric layer 461, or a zig-zag shape 562 on dielectric layer 561. FIGS. 5A-5D indicate 4 types of reinforcing patterns as examples, but the reinforcing pattern shape is not limited thereto and can be appropriately determined in consideration of a direction of stress applied to the capacitor component, or the like.

In an exemplary embodiment, the reinforcing pattern may have tensile strength different from that of the margin portion. As used herein, the term "tensile strength" may refer to stress at a point in time at which a subject breaks or cracks when tensile force is applied to the subject at an angle of 180°.

The tensile strength of the reinforcing pattern may be 1.1 times higher than that of a dielectric layer, but is not limited thereto. The tensile strength of the reinforcing pattern may be at least 1.10 times, at least 1.12 times, at least 1.14 times, at least 1.16 times, at least 1.18 times, or at least 1.20 times higher than that of a dielectric layer, and is not limited thereto, but is less than 100 times. When the reinforcing pattern has tensile strength of said range, external stress may be relieved, thereby reducing the stress delivered to the capacitor component.

In an exemplary embodiment, the reinforcing pattern may include a metal. The metal is not particularly limited as long as it satisfies the tensile strength of said range, but for example, may include silver (Ag), palladium (Pd), gold (Au), platinum (Pt), nickel (Ni), copper (Cu), tin (Sn), tungsten (W), titanium (Ti), iron (Fe), aluminum (Al), magnesium (Mg), or alloys thereof. In an example, the metal may include the same ingredients as a metal included in the internal electrodes.

When a reinforcing pattern includes a metal, the reinforcing pattern may be a metal layer. Such metal layer may be formed, for example, by directly attaching a metal film to a ceramic green sheet and attaching another ceramic green sheet on the metal layer or applying a metal pattern to a ceramic green sheet using a paste containing a metal and attaching the ceramic green sheet to the paste, followed by plasticizing the same. When the reinforcing pattern is a metal layer, high tensile strength may be obtained with relatively low cost.

In another exemplary embodiment, the reinforcing pattern may include a ceramic material. The ceramic material is not particularly limited as long as it satisfies the tensile strength of said range after sintering. For example, the ceramic material may include the ceramic material included in the dielectric layer or the ceramic material having the same ingredients as those of the dielectric layer while adjusting specific content ratios of ingredients so as to have adjusted tensile strength.

When a reinforcing pattern includes a ceramic material, the reinforcing pattern may be a ceramic layer. Such a ceramic layer may be formed by printing a ceramic pattern using a ceramic material forming the reinforcing pattern on a ceramic green sheet followed by attaching the ceramic green sheet to the ceramic material. In the case of forming the reinforcing pattern with the ceramic material, a shrinkage initiation temperature can be adjusted to be identical to a temperature of the body.

In an example, an average width of the reinforcing pattern may be 5 μm or less. A width of the reinforcing pattern may refer to a thickness or a length of the reinforcing pattern included inside the margin portion in the Y direction (the third direction). The average width of the reinforcing pattern may be an average of 5 widths measured in 5 different cross sections of the sintered margin portions.

The average width of the reinforcing pattern may be 5 μm or less, 4 μm or less, 3 μm or less or 2 μm or less. A lowest limit is not particularly limited, but may be at least 0.01 When the average width of the reinforcing pattern satisfies said range, mechanical strength of the capacitor component can be effectively improved without significantly affecting a size of the capacitor component.

Figure 6A:
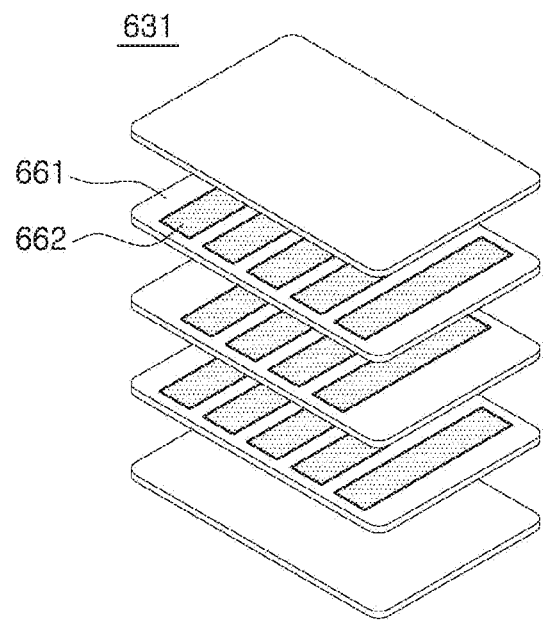
FIGS. 6A and 6B are examples of reinforcing patterns according to exemplary embodiments.
Figure 6B:
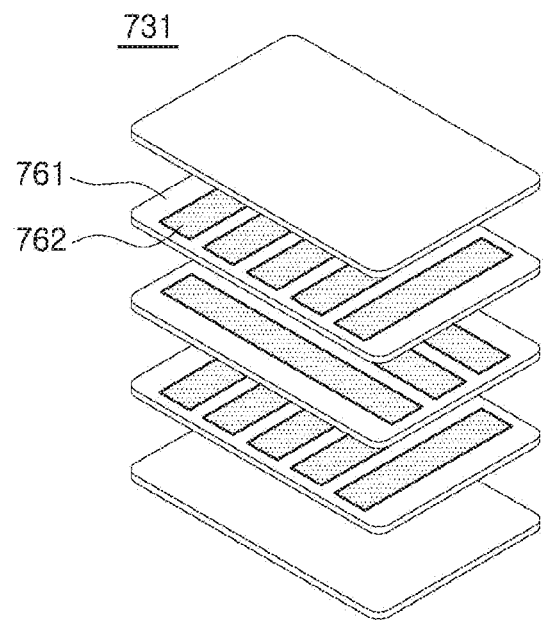

In an exemplary embodiment, the reinforcing pattern included in the margin portions may include two or more layers. The two or more reinforcing pattern layers included in the margin portions may refer to two or more reinforcing patterns spaced apart in the width direction (Y direction) inside the margin portions. FIGS. 6A, 6B, and 7B show examples illustrating the margin portion including two or more reinforcing pattern layers. Referring to FIGS. 6A, 6B, and 7B, the reinforcing patterns 662 on dielectric layer 661, 762 on dielectric layer 761, and 962 on dielectric layer 961 may be spaced apart in the thickness direction inside the margin portions 631, 731, and 132. FIGS. 6A, 6B, and 7B indicate as examples structures in which two reinforcing pattern layers are disposed; however, the reinforcing patterns may be disposed in three or more, four or more or five or more layers, and may be, for example, 50 layers or less.

In an exemplary embodiment, two or more layers of the reinforcing pattern may have trend lines aligned with each other. As used herein, the term "trend line" may refer to a line from a point of one end to a point of the other end in a direction having a greatest value among the length, width, and thickness of the reinforcing pattern. The trend lines aligned with each other may refer to at least two trend lines having an angle formed thereby of less than 90°. Further, when an angle formed by two or more trend lines is 0°, the trend lines may be disposed in parallel to each other, as illustratively shown in FIG. 6A in which the reinforcing patterns in each layer are disposed to be aligned with each other and parallel to each other, and in which the reinforcing patterns in different layers are disposed to be aligned with each other and parallel to each other.

In another exemplary embodiment, two or more layers of the reinforcing pattern may be disposed so that the trend lines intersect, as illustratively shown in FIG. 6B. The intersecting trend lines may refer to at least two trend lines having an angle formed thereby of at least 90°. Further, when an angle formed by at least two trend lines is 90° (e.g., range of 70° to 110°), the trend lines are disposed orthogonally, as illustratively shown in FIG. 6B in which the reinforcing patterns in different layers are disposed to intersect and to be disposed orthogonally with respect to each other.

In an example, two or more layers of the reinforcing pattern may provide reinforcing patterns in which the trend lines within each layer are arranged to be aligned with each other while the trend lines of one layer intersect with the trend lines in adjacent layers, such as in the example of FIG. 6B. In this case, the different reinforcing patterns may be spaced apart from each other with respect to the length, thickness, and width directions. Moreover, as shown in FIG. 7B, the reinforcing patterns in the two or more layers may be laterally offset from each other (e.g., in the X direction) such that the reinforcing patterns in one layer overlaps at least partially in the Y direction with a gap between reinforcing patterns in another layer. The reinforcing patterns in one layer may also overlap in the Y direction with gaps between reinforcing patterns in another layer so as to extend across the gaps between the reinforcing patterns in the other layer, as shown in FIG. 7B.

In another example, two or more layers of the reinforcing pattern may include both reinforcing pattern(s) containing the metal layer and reinforcing pattern(s) containing the ceramic layer, which are previously described. In this case, reinforcing patterns including the metal layer(s) and reinforcing patterns including ceramic layer(s) may be alternately laminated or laminated with the same type, but are not limited thereto.

The first and second margin portions 131 and 132 may be formed of an insulating material, and may be formed of a ceramic material such as barium titanate. In this case, the first and second margin portions may include the same ceramic material as the dielectric layer 111 or may be formed of the same material as the dielectric layer 111.

In an example, an average width of the first and second margin portions (e.g., the average width measured in the Y direction) may be 20 µm or less. The average width of the margin portions may be measured as an average of 5 widths measured in 5 different cross sections of the sintered margin portions.

The average width of the margin portions may be, for example, 20 µm or less, 19 µm or less, 18 µm or less, 17 µm or less, 16 µm or less or 15 µm or less. A lowest limit thereof is not particularly limited, but may be at least 5 µm or more or 6 µm or more.

The width of the margin portions may refer to a dimension of the first and second margin portions 131 and 132 in the third direction (Y direction).

Figure 8:
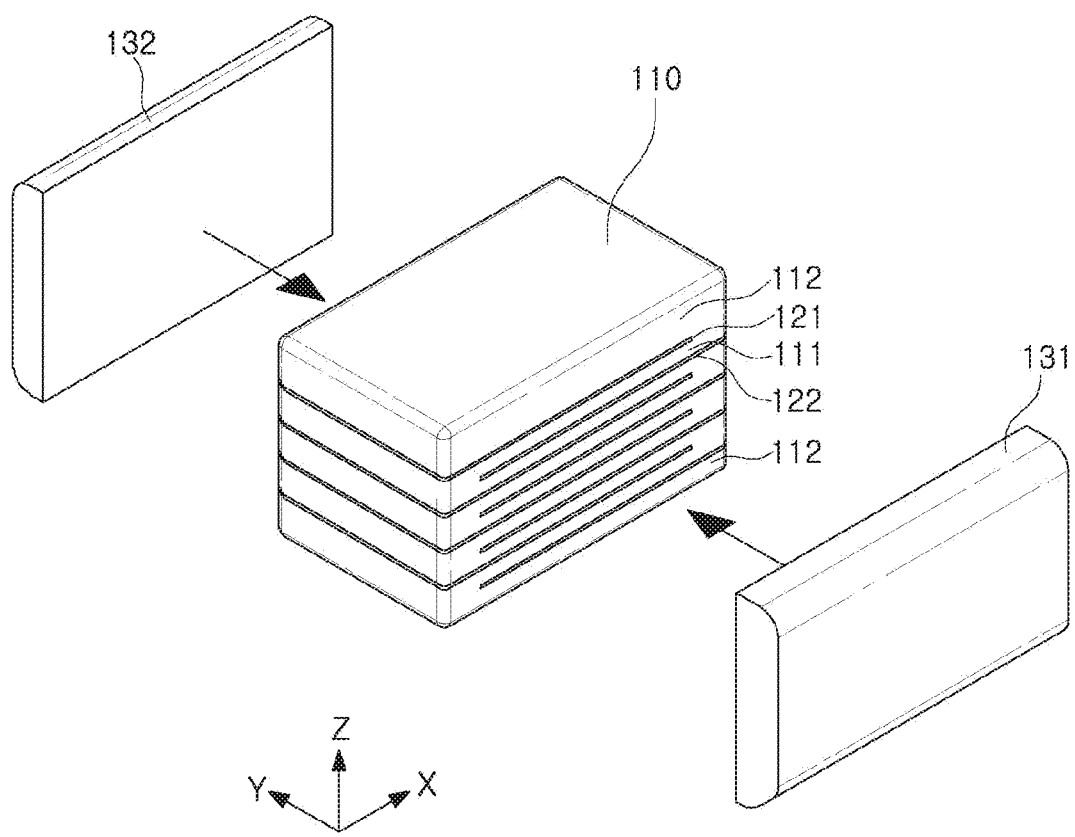
FIG. 8 is a diagram illustrating a process of combining margin portions with a lamination portion of a capacitor component according to an exemplary embodiment.
Figure 9:
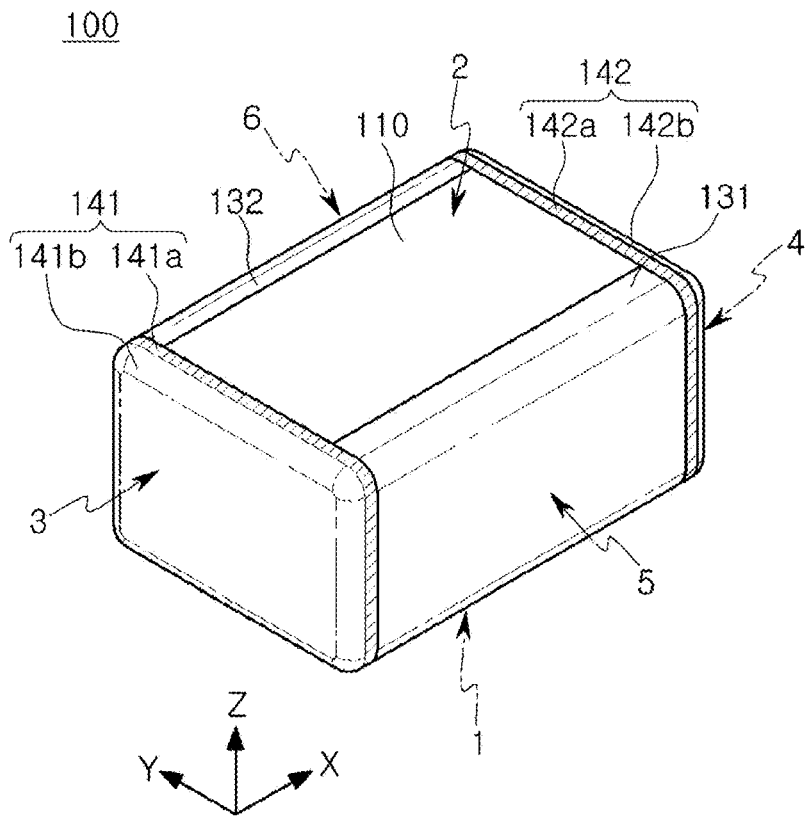
FIGS. 9, 10, 11A, 11B, 12A, and 12B are schematic diagrams illustrating a capacitor component according to another exemplary embodiment.
Figure 10:
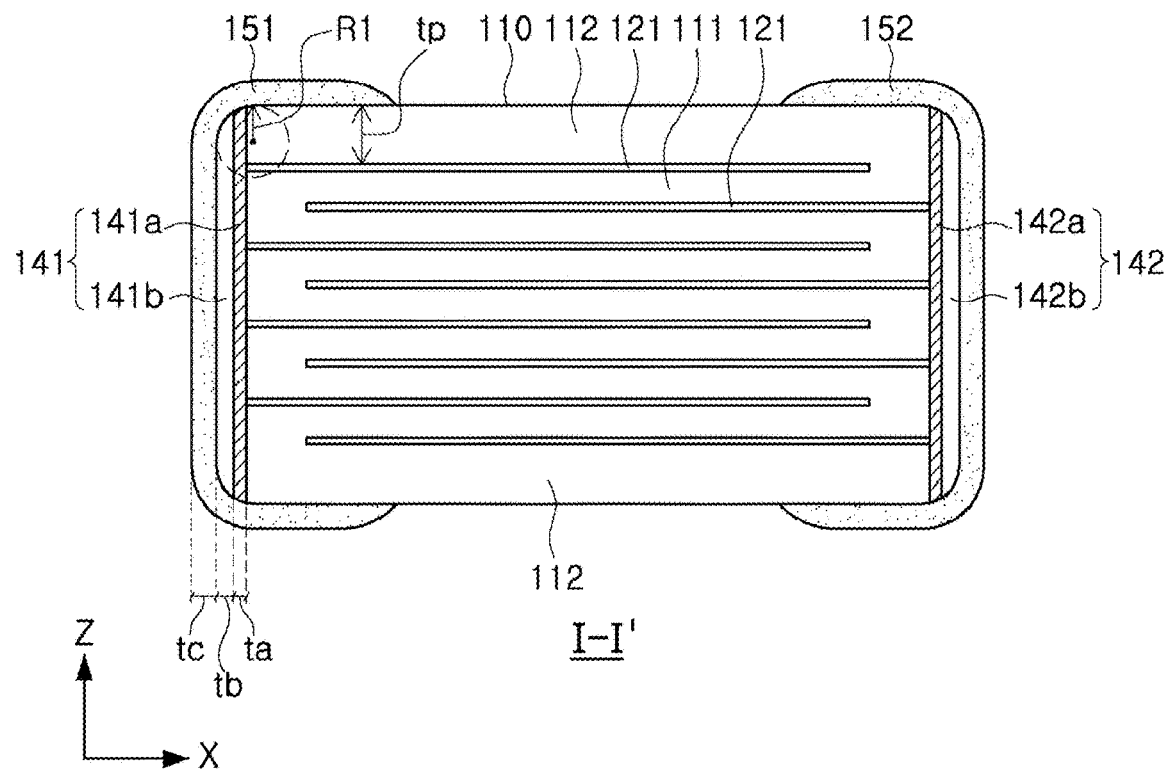
Figure 11A:
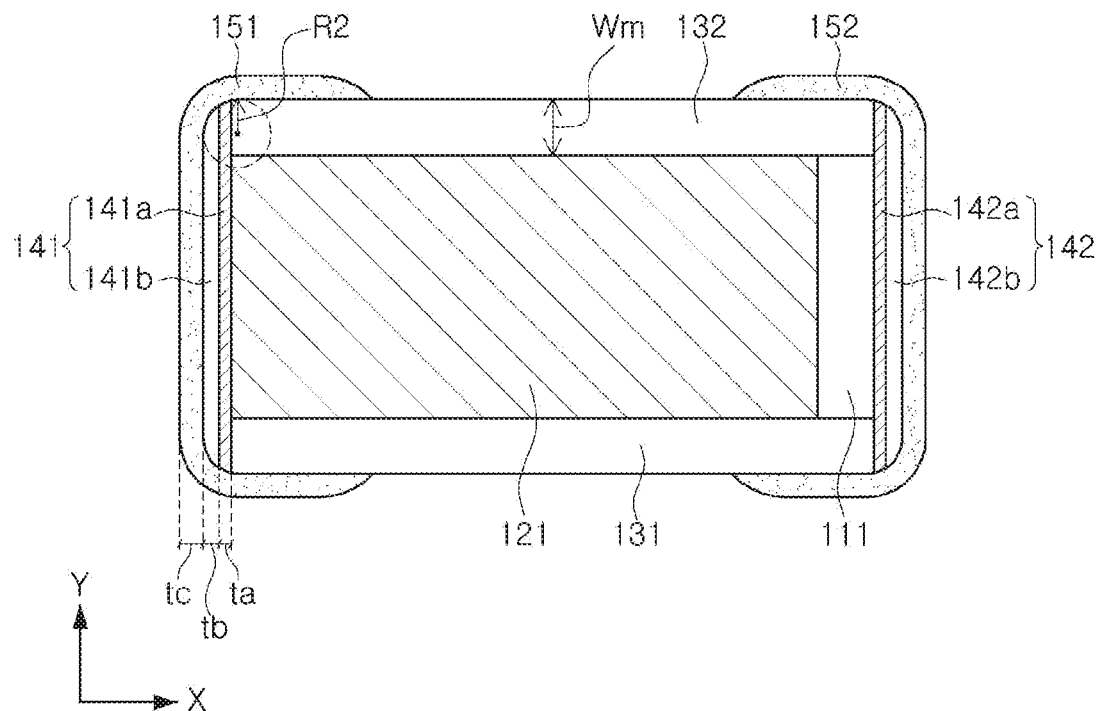
Figure 11B:
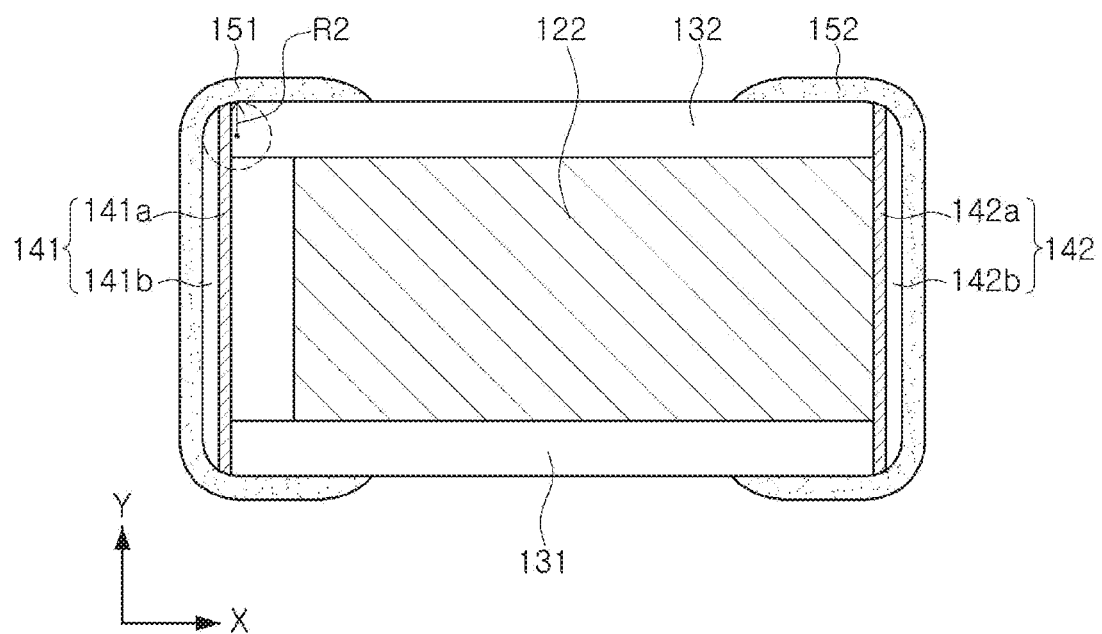
Figure 12A:
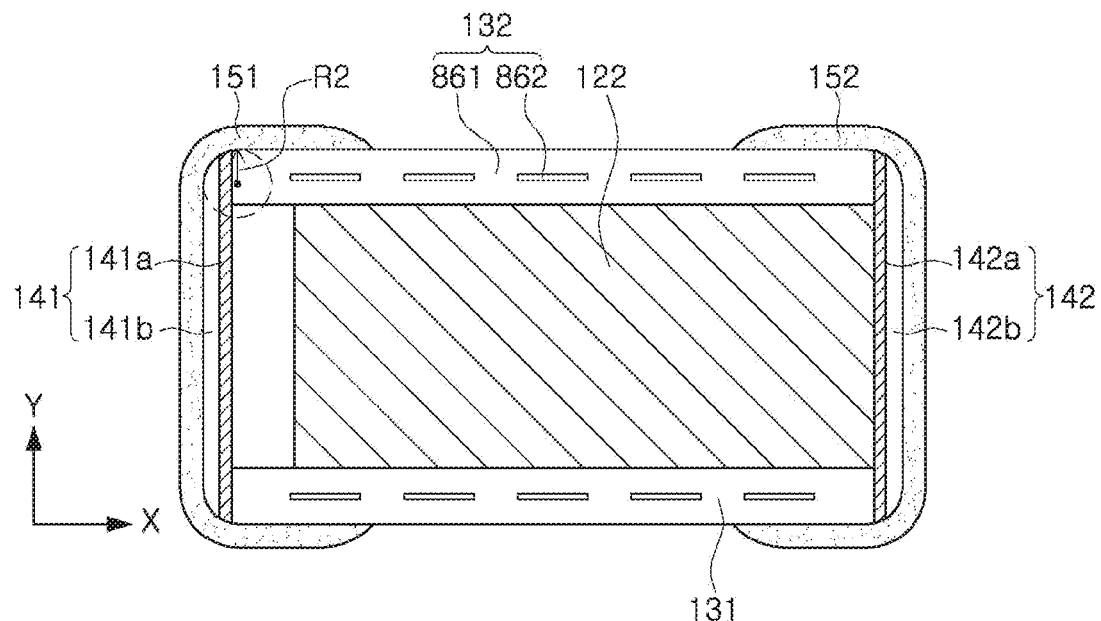
Figure 12B:
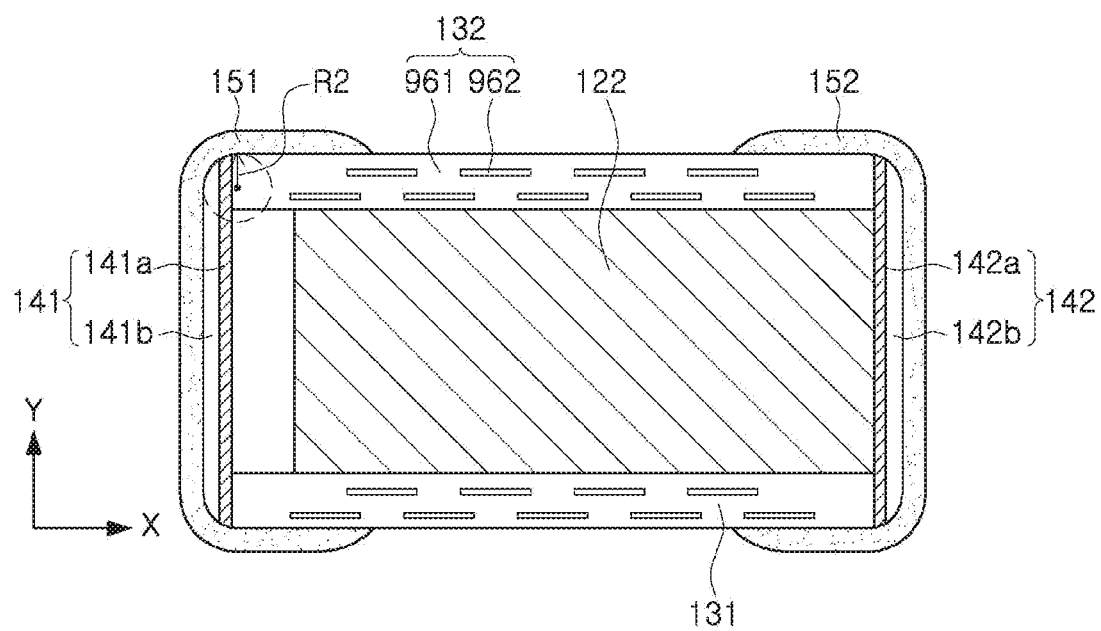

A method for forming the first and second margin portions 131 and 132 is not particularly limited, but may be formed by attaching a dielectric sheet including the previously described reinforcing pattern to both surfaces of the lamination portion in the third direction, as illustratively shown in FIG. 8.

The first and second margin portions 131 and 132 may also be formed by transferring the dielectric sheet including the reinforcing pattern using a transfer method. In this case, the first and second margin portions 131 and 132 may have a uniform thickness. A ratio of a minimum thickness Wmin to a maximum thickness Wmax may be 0.9 to 1.0 when the Wmin and Wmax refer to minimum and maximum thicknesses of each of the first and second margin portions 131 and 132.

Conventionally, a surface of the dielectric layers (e.g., 111) was formed to be larger than that of an internal electrodes (e.g., 121 and 122) in order to form margin portions around circumferential portions of the internal electrodes other than portions connected to external electrodes. In this case, however, when dozens to hundreds of dielectric layers are laminated, the dielectric layers elongate to fill a step portion, and the internal electrodes bend. When the internal electrodes bend, breakdown voltage (BDV) is reduced in the bent portion.

Accordingly, the step can be prevented from occurring due to the internal electrodes extending only partially across the ceramic layers by removing the margin portions on both opposing side surfaces of the lamination portion 110 of the capacitor component according to an exemplary embodiment in the third direction. By preventing the internal electrodes from bending, the BDV can be prevented from being reduced, thereby improving the reliability of the capacitor component.

In an exemplary embodiment, the lamination portion 110 includes a capacitance forming portion on which capacity is formed by including the first and second internal electrodes 121 and 122 disposed to face each other with respective dielectric layers 111 interposed therebetween, and first and second cover portions 112 formed above the uppermost internal electrode (121 or 122) and below the lowermost internal electrode (121 or 122) provided in the capacitance forming portion. The first and second cover portions may include a reinforcing pattern inside.

Descriptions related to tensile strength, a material, a structure and a number of patterns, or the like are the same as those of the reinforcing pattern of the margin portions previously described, and thus are omitted.

The first and second cover portions 112 may have the same composition as the dielectric layers 111 and may be formed by laminating at least one dielectric layer, which does not include internal electrodes, on each of an upper portion of an uppermost internal electrode and a lower portion of a lowermost internal electrode of the body 100.

The first and second cover portions 112 may basically prevent damage on the internal electrodes caused by physical or chemical stress.

A thickness (tp) of each of the first and second cover portions 112 may be, for example, 25 μm or less. The thickness (tp) of each of the first and second cover portions 112 may be 25 μm or less, 24 μm or less, 23 μm or less, 22 μm or less, 21 μm or less or 20 μm or less. Capacity per unit volume of the capacitor component 10 can be improved by minimizing the thickness (tp) of each of the first and second cover portions 112.

In addition, a lowest limit of the thickness tp is not limited, and can be appropriately determined considering a radius (R1 and/or R2) of curvature of the edge of the body in a first and second directional cross section, and may be, for example, 5 μm or more.

As used herein, the thickness (tp) of each of the first and second cover portions 112 may be may refer to a dimension of the upper and lower cover portions 112 in the first direction (Z direction).

Figure 7A:
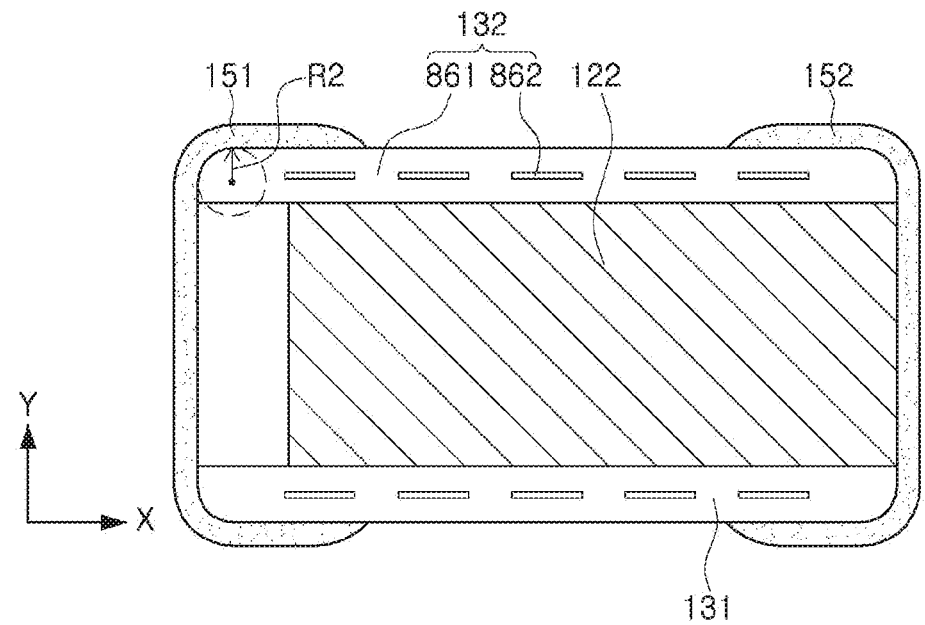
FIGS. 7A and 7B are examples of reinforcing patterns according to exemplary embodiments.
Figure 7B:
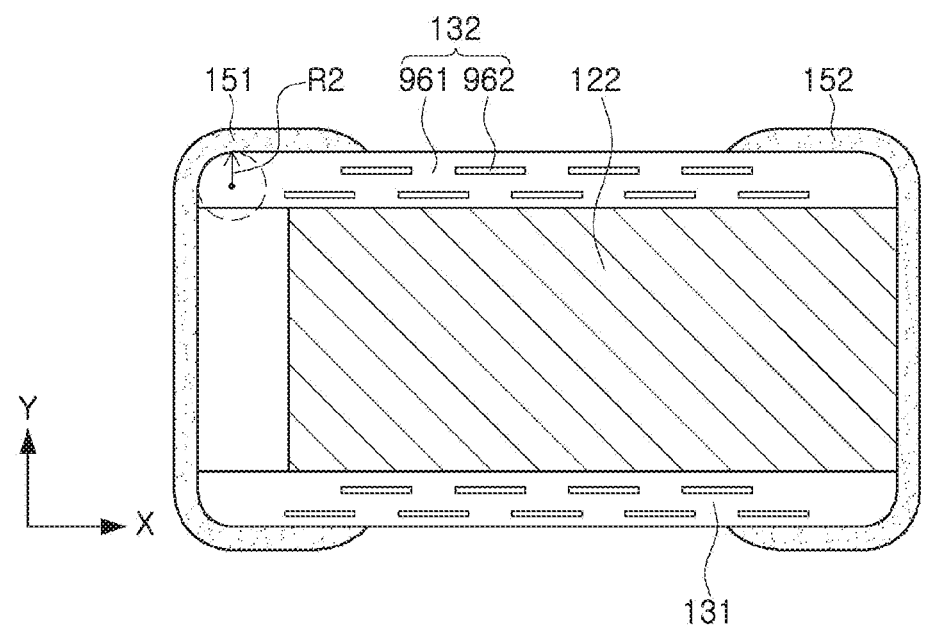

The first and second external electrodes 151 and 152 may be disposed on both opposing surfaces of the body in the third direction (Y direction), as illustratively shown in FIG. 7A. The first and second external electrodes 151 and 152 may extend toward both opposing surfaces of the body in the first direction (Z direction) as well as both opposing surfaces of the body in the third direction (Y direction).

Additionally, the first and second external electrodes 151 and 152 may extend to a portion of the first and second surfaces 1 and 2. The first and second external electrodes 151 and 152 may extend even to a portion of the fifth and sixth surfaces 5 and 6 of the body, as illustratively shown in FIG. 7A. When the first and second external electrodes 151 and 152 extend over a portion of the fifth and sixth surfaces 5 and 6 of the body, the first and second external electrodes 151 and 152 extend over the first and second margin portions 131 and 132 and over the reinforcing patterns 862 provided on dielectric layer 861 in the margin portions.

A method for forming the first and second external electrodes 151 and 152 should not be particularly limited, and for example, may be formed by dipping the body in a paste containing a conductive metal and glass or transferring a dry film obtained by drying the metal paste on the body.

In an exemplary embodiment according to the present disclosure, the first and second external electrodes may use at least one of silver (Ag), palladium (Pd), gold (Au), platinum (Pt), nickel (Ni), copper (Cu), tin (Sn), tungsten (W), titanium (Ti) and alloys thereof. Further, in order to improve mountability on the substrate, a plated layer may be formed on the first and second external electrodes 151 and 152.

FIGS. 9, 10, 11A-11B, and 12A-12B are schematic diagrams illustrating a capacitor component according to another exemplary embodiment. Referring to FIGS. 9, 10, 11A-11B, and 12A-12B, the capacitor component 100 of the present disclosure may include first and second connection portions 141 and 142, which are respectively electrically connected to the first and second internal electrodes 121 and 122, and the first and second external electrodes 151 and 152, having a thickness (tc), may be respectively disposed on the first and second connection portions 141 and 142.

The first and second connection portions 141 and 142 may include metal layers 141*a* and 142*a* disposed on the lamination portion 110 and ceramic layers 141*b* and 142*b* disposed on the metal layers 141*a* and 142*a*.

The metal layers 141*a* and 142*a* are disposed on respective opposing surfaces of the lamination portion 110 in the second direction (X direction) so as to be electrically connected to the first and second internal electrodes 121 and 122, respectively.

The metal layers 141*a* and 142*a* may include a metal having high electrical conductivity, and may include a metal the same as that of the first and second electrodes 121 and 122 to enhance electrical connectivity to the first and second internal electrodes 121 and 122. For example, the metal layers 141*a* and 142*a* may include at least one of silver (Ag), palladium (Pd), gold (Au), platinum (Pt), nickel (Ni), copper (Cu), tin (Sn), tungsten (W), titanium (Ti) and alloys thereof.

The metal layers 141*a* and 142*a* may be provided in the form of a sintered electrode, and may be sintered simultaneously with a lamination portion 110. In this case, the metal layers 141*a* and 142*a* before the sintering may be transferred to the lamination portion 110 in a state containing an organic material such as a binder and a metal particle. After the sintering, the organic material, or the like may be removed.

A thickness (ta) of the metal layer is not particularly limited, but may be, for example, 1 μm to 10 μm. As used herein, the thickness (ta) of the metal layer may refer to a dimension of the metal layer in the second direction (X direction).

The ceramic layers 141*b* and 142*b* are disposed on the metal layers 141*a* and 142*a*, respectively, and minimize penetration of moisture, a plating solution, or the like, from outside by improving sealing characteristics. The ceramic layers 141*b* and 142*b* may be formed not to cover cross sections of the metal layers 141*a* and 142*b* in the first and third directions (Z and Y directions).

The ceramic layers 141*b* and 142*b* may be formed of ceramic materials such as barium titanate, or the like. In this case, the ceramic layers 141*b* and 142*b* may contain the ceramic materials and the materials contained in the dielectric layers 111 or formed of the same materials as the dielectric layers 111.

The ceramic layers 141*b* and 142*b* may also be formed by the transfer process as the metal layers 141*a* and 142*a*, followed by sintering. It is preferable that the ceramic layers 141*b* and 142*b* before the sintering have high adhesion for the transfer process, and thus may include relatively a large amount of organic materials such as a binder, or the like. In this case, as there may be some organic materials remaining even after the sintering, the ceramic layers 141*b* and 142*b* may contain a larger amount of the organic materials than the dielectric layers 111.

A thickness (tb) of the ceramic layer is not particularly limited, but may be, for example, 3 μm to 15 μm. As used herein, the thickness (tb) of the ceramic layer may refer to a dimension of the ceramic layer in the second direction (X direction).

In an exemplary embodiment, the first and second connection portions 141 and 142 may be formed by a sheet transfer method and may have a uniform thickness. Accordingly, a ratio of a minimum thickness to a maximum thickness of the first and second connection portions 141 and 142 is 0.9 to 1.0. The thickness of the first and second connection portions 141 and 142 may refer to a dimension of the first and second connection portions 141 and 142 in the second direction (X direction).

When the capacitor component according to the present disclosure has the previously described first and second connection portions, not only moisture resistance reliability can be obtained but also mechanical strength of the capacitor component can be increased.

According to an exemplary embodiment, a crack can be prevented from occurring by applying a reinforcing pattern to the margin portions.

According to another exemplary embodiment, a capacitor component can have improved mechanical strength and thus can have improved moisture resistance reliability by including the margin portions and/or the cover portions having at least one reinforcing pattern.

Meanwhile, various and beneficial advantages and effects of the present disclosure are not limited to the above description, and are more readily understood in the specific exemplary embodiments of the present disclosure.

While exemplary embodiments have been shown and described above, it will be apparent to those skilled in the art that modifications and variations could be made without departing from the scope of the present disclosure as defined by the appended claims.

What is claimed is:

1. A capacitor component, comprising:
a body comprising:
a lamination portion in which first internal electrodes and second internal electrodes are alternately disposed to face each other in a first direction with dielectric layers disposed therebetween;
first and second margin portions disposed on respective opposing sides of the lamination portion in a second direction perpendicular to the first direction; and
first and second cover portions respectively disposed above an uppermost internal electrode and below a lowermost internal electrode of the lamination portion;
first and second connection portions disposed on respective opposing surfaces of the lamination portion opposite each other in a third direction, each of the first and second connection portions includes a metal layer contacting a respective one of the opposing surfaces of the lamination portion opposite each other in the third direction, and a ceramic layer covering the metal layer and disposed between the metal layer and a respective one of the first and second external electrodes, the ceramic layer does not cover a cross-section of the metal layer in the first and third directions; and
first and second external electrodes disposed on respective opposing sides of the body in the third direction and electrically connected to the first and second internal electrodes, respectively,
wherein each of the first and second margin portions comprises a reinforcing pattern, and
wherein at least one of the first and second cover portions comprises two or more of the reinforcing patterns.

2. The capacitor component of claim 1, wherein an average width of the first and second margin portions is 20 µm or less.

3. The capacitor component of claim 1, wherein an average width of the reinforcing patterns in each of the first and second margin portions is 5 µm or less.

4. The capacitor component of claim 1, wherein tensile strength of the reinforcing patterns is 1.1 times higher than tensile strength of the dielectric layers.

5. The capacitor component of claim 1, wherein the reinforcing patterns comprise a metal.

6. The capacitor component of claim 1, wherein the reinforcing patterns include metal patterns disposed on ceramic sheets.

7. The capacitor component of claim 1, wherein the reinforcing patterns comprise a ceramic material.

8. The capacitor component of claim 1, wherein the reinforcing patterns include ceramic patterns disposed on ceramic sheets.

9. The capacitor component of claim 1, wherein each of the first and second margin portions comprises two or more layers of reinforcing patterns.

10. The capacitor component of claim 9, wherein the two or more layers of reinforcing patterns have trend lines that are aligned with each other.

11. The capacitor component of claim 9, wherein the two or more layers of reinforcing patterns have trend lines that intersect with each other.

12. The capacitor component of claim 9, wherein the two or more layers of reinforcing patterns have trend lines that are aligned with each other, and the reinforcing patterns in one layer overlap in the second direction with gaps between reinforcing patterns in another layer of the two or more layers.

13. The capacitor component of claim 9, wherein the two or more layers of the reinforcing patterns comprise a metal pattern printed on a ceramic sheet and a ceramic pattern printed on a ceramic sheet.

14. A capacitor component, comprising:
a lamination portion in which first internal electrodes and second internal electrodes are alternately disposed to face each other in a first direction with respective dielectric layers interposed therebetween; and
first and second external electrodes electrically connected to the first and second internal electrodes, respectively,
wherein the lamination portion comprises a capacitance forming portion in which capacitance is formed by the first and second internal electrodes alternately disposed to face each other with respective dielectric layers interposed therebetween, and first and second cover portions respectively disposed above an uppermost internal electrode and below a lowermost internal electrode of the capacitance forming portion, and
at least one of the first and second cover portions comprises two or more layers of reinforcing patterns, and the reinforcing patterns in one layer extend across gaps between the reinforcing patterns in another layer among the two or more layers.

15. The capacitor component of claim 14, wherein tensile strength of the reinforcing patterns is 1.1 times higher than tensile strength of the dielectric layers.

16. The capacitor component of claim 14, wherein the reinforcing patterns comprise a metal or a ceramic material.

17. The capacitor component of claim 14, wherein an average thickness of the first and second internal electrodes is 0.4 µm or less.

18. A capacitor component comprising:
a lamination portion in which first internal electrodes and second internal electrodes are alternately disposed to face each other in a first direction with respective dielectric layers interposed therebetween; and
first and second margin portions disposed on respective opposing sides of the lamination portion opposite each other in a second direction perpendicular to the first direction, and
first and second cover portions respectively disposed above an uppermost internal electrode and below a lowermost internal electrode of the lamination portion;
wherein at least one of the first and second margin portions comprises two or more layers of first reinforcing patterns disposed in a plane parallel to the first direction to be spaced apart from each other and electrically isolated from the first and second internal electrodes, and the first reinforcing patterns in one layer extend across gaps between the first reinforcing patterns in another layer among the two or more layers, and wherein at least one of the first and second cover portions comprises two or more second reinforcing patterns.

19. The capacitor component of claim 18, wherein the first reinforcing patterns are spaced apart from each other in the first direction.

20. The capacitor component of claim 18, wherein the first reinforcing patterns are spaced apart from each other in a third direction orthogonal to the first and second directions.

21. The capacitor component of claim 18, wherein the two or more layers are spaced apart from each other in the second direction, and the first reinforcing patterns in each layer of the two or more layers are disposed to be spaced apart from each other in the plane parallel to the first direction.

22. The capacitor component of claim 21, wherein the first reinforcing patterns in one layer overlap in the second direction with gaps between the first reinforcing patterns in another layer of the two or more layers.

23. The capacitor component of claim 18, further comprising:
first and second external electrodes disposed on respective opposing sides of the lamination portion opposite each other in a third direction orthogonal to the first and second directions, and respectively electrically connected to the first and second internal electrodes.

24. The capacitor component of claim 18, wherein the first and second reinforcing patterns have tensile strength that is 1.1 times higher than tensile strength of the dielectric layers.

25. The capacitor component of claim 18, wherein the first and second reinforcing patterns include metal patterns disposed on ceramic sheets.

26. The capacitor component of claim 18, wherein the first and second reinforcing patterns include ceramic patterns disposed on ceramic sheets.

27. A capacitor component, comprising:
a lamination portion in which first internal electrodes and second internal electrodes are alternately disposed to face each other in a first direction with respective dielectric layers interposed therebetween; and
first and second external electrodes electrically connected to the first and second internal electrodes, respectively,
wherein the lamination portion comprises first and second cover portions respectively disposed above an uppermost internal electrode and below a lowermost internal electrode of the first and second internal electrodes,
at least one of the first and second cover portions comprises two or more layers of reinforcing patterns disposed in a plane orthogonal to the first direction to be spaced apart from each other and electrically isolated from the first and second external electrodes, and
the reinforcing patterns in one layer extend across gaps between the reinforcing patterns in another layer among the two or more layers.

28. The capacitor component of claim 27, wherein the first and second external electrodes respectively contact the first and second internal electrodes on opposing surfaces of the lamination portion opposite each other in a third direction, and the reinforcing patterns are spaced apart from each other in the third direction.

29. The capacitor component of claim 27, wherein the first and second external electrodes respectively contact the first and second internal electrodes on opposing surfaces of the lamination portion opposite each other in a third direction, and the reinforcing patterns are spaced apart from each other in a second direction orthogonal to the first and third directions.

30. The capacitor component of claim 27, wherein the two or more layers are spaced apart from each other in the first direction, and the reinforcing patterns in each layer of the two or more layers are disposed to be spaced apart from each other in the plane orthogonal to the first direction.

31. The capacitor component of claim 27, wherein the reinforcing patterns in one layer overlap in the first direction with gaps between reinforcing patterns in another layer among the two or more layers.

32. The capacitor component of claim 27, wherein the reinforcing patterns have tensile strength that is 1.1 times higher than tensile strength of the dielectric layers.

33. The capacitor component of claim 27, wherein the reinforcing patterns include metal patterns disposed on ceramic sheets.

34. The capacitor component of claim 27, wherein the reinforcing patterns include ceramic patterns disposed on ceramic sheets.

35. A capacitor component, comprising:
a lamination portion in which first internal electrodes and second internal electrodes are alternately disposed to face each other in a first direction with respective dielectric layers interposed therebetween;
first and second cover portions respectively disposed above an uppermost internal electrode and below a lowermost internal electrode of the lamination portion;
first and second connection portions disposed on respective opposing surfaces of the lamination portion opposite each other in a third direction; and
first and second external electrodes respectively disposed on the first and second connection portions,
wherein each of the first and second connection portions includes a metal layer contacting a respective one of the opposing surfaces of the lamination portion opposite each other in the third direction, and a ceramic layer covering the metal layer and disposed between the metal layer and a respective one of the first and second external electrodes, the ceramic layer does not cover a cross-section of the metal layer in the first and third directions,
wherein at least one of the first and second cover portions comprises two or more reinforcing patterns.

36. The capacitor component of claim 35, wherein the metal layer of the first connection portion contacts the first internal electrodes on the respective one of the opposing surfaces of the lamination portion opposite each other in the third direction, and the metal layer of the second connection portion contacts the second internal electrodes on the respective one of the opposing surfaces of the lamination portion opposite each other in the third direction.

37. The capacitor component of claim 35, wherein the metal layer of each of the first and second connection portions covers an entirety of the respective one of the opposing surfaces of the lamination portion opposite each other in the third direction, and the ceramic layer of each of the first and second connection portions covers an entirety of a surface of the respective metal layer orthogonal to the third direction.

* * * * *